(12) United States Patent
Arola et al.

(10) Patent No.: US 9,886,119 B1
(45) Date of Patent: Feb. 6, 2018

(54) CAPACITIVE SENSOR (71) Applicant: Microsoft Technology Licensing, LLC, Redmond, WA (US)

(72) Inventors: Joni Arola, Tampere (FI); Hiroshi Sasaki, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/226,513

(22) Filed: Aug. 2, 2016

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04106* (2013.01)

(58) Field of Classification Search
CPC ......... G06F 2203/04105; G06F 3/0414; G06F 2203/04102
See application file for complete search history.

(56) References Cited

U.S. PATENT DOCUMENTS

| | | | |
|---|---|---|---|
| 3,703,681 | A | 11/1972 | Johnson et al. |
| 8,610,443 | B1 | 12/2013 | Ryshtun et al. |
| 9,016,143 | B2 | 4/2015 | Mamigonians |
| 2011/0254758 | A1 | 10/2011 | Lin et al. |
| 2012/0113047 | A1 | 5/2012 | Hanauer et al. |
| 2013/0068038 | A1 | 3/2013 | Bolender et al. |
| 2014/0008203 | A1 | 1/2014 | Nathan et al. |
| 2014/0260691 | A1* | 9/2014 | Hammerschmidt .. G01L 5/0052 73/862.626 |
| 2015/0084909 | A1 | 3/2015 | Norfolk et al. |
| 2017/0212616 | A1* | 7/2017 | Zou .......................... G06F 3/044 |

FOREIGN PATENT DOCUMENTS

JP 2007173068 A 7/2007
WO 2009131370 A2 10/2009

OTHER PUBLICATIONS

Kim, et al., "Development of a Carbon Nanotube-Based Touchscreen Capable of Multi-Touch and Multi-Force Sensing", In Journal of Sensors, vol. 15, Issue 11, Nov. 13, 2015, pp. 28732-28741.
"International Search Report and Written Opinion Issued in PCT Application No. PCT/US2017/043819", dated Oct. 26, 2017, 11 pages.

* cited by examiner

*Primary Examiner* — Koosha Sharifi-Tafreshi (57) ABSTRACT

A sensor and a method for detecting a displacement are disclosed with one implementation having a force sensor on a display. The sensor reacts to a bend of a conductor, wherein a diameter of the bends corresponds to a self-capacitance that is measurable from the conductor. In one embodiment the bent conductor is placed between two circuit boards or between a circuit board and a display, wherein a force applied to either surface causes a change in the bend diameter and the force may be measured. The sensor may be digital with a processor or analog with discrete components.

20 Claims, 8 Drawing Sheets

CAPACITIVE SENSOR

BACKGROUND

Force sensors detect capacitance between two parallel plates, wherein the displacement of either plates changes the capacitance measured between the plates. As the displacement may be a function of force applied to a surface, the displacement is relative to the force. In addition to force sensing, the capacitive sensor may be used to measure the displacement or a change in distance between two elements. One example of a capacitive force sensor is a smartphone force sensor, wherein the force and/or position of the force applied on a display may be detected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A sensor for detecting a displacement is disclosed. Also are disclosed a corresponding method and an implementation having a force sensor on a display. The sensor reacts to a bend of a conductor, wherein a distance between the ends of the bent conductor or a diameter of the bend corresponds to a self-capacitance that is measurable from the conductor. In one embodiment the bent conductor is placed between two circuit boards or between a circuit board and a display, wherein a force applied to either surface causes a change in the bend diameter and the force may be measured. The sensor may be used for measuring the force applied to the display. The sensor may be digital with a processor or analog with discrete components.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in a smartphone, the device described is provided as an example and not a limitation. As those skilled in the art will appreciate, the present embodiments are suitable for application in a variety of different types of apparatuses implementing a force sensor or any displacement sensor, e.g. in tablets, smart watches, laptops, gaming consoles, larger devices such as televisions or in applications monitoring the displacement in various industrial applications, wear monitors or alike. This disclosure is not limited to the applications described hereinafter, it is understood that the sensor is a multipurpose component suitable for different applications. The embodiment disclosing a display may be a peripheral connected to a system, wherein at least a portion of the user interface is implemented in the display.

Figure 1:
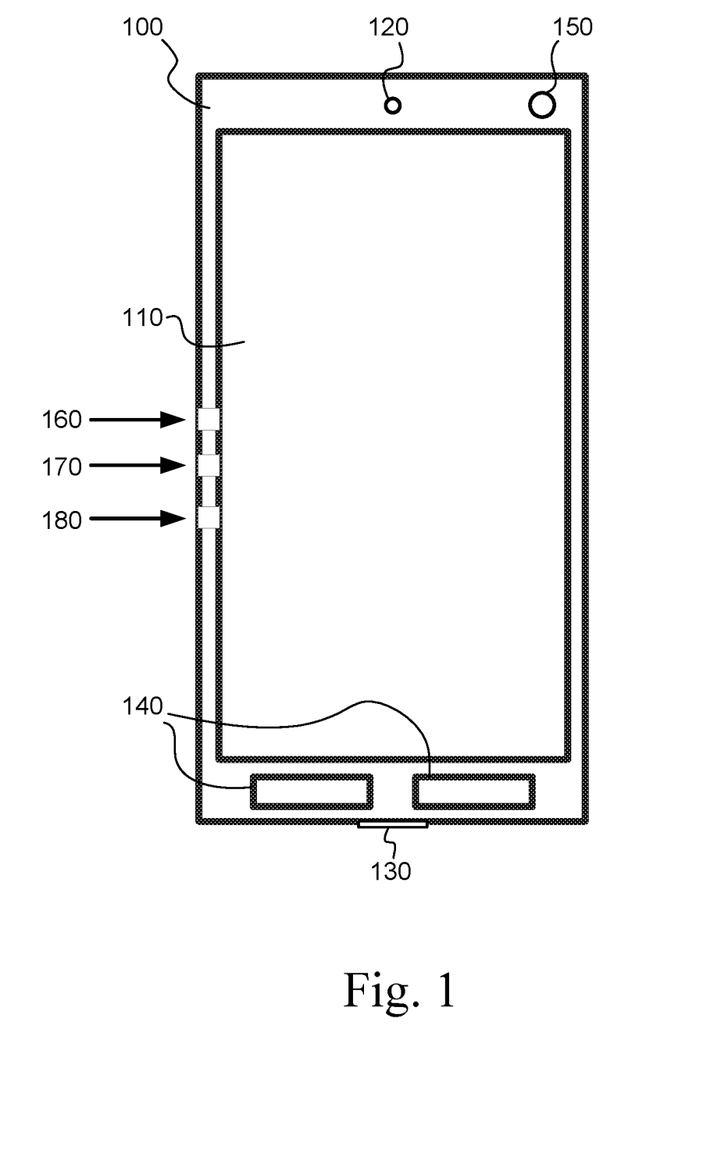
FIG. 1 illustrates a device according to an embodiment.

FIG. 1 illustrates a device according to an embodiment, wherein the device is a smartphone. The device comprises a body 100 comprising a display 110, a speaker 120, a microphone 130, keys 140 and a camera 150. The device comprises at least one processor 160 and at least one memory 170 including computer program code for one or more programs. The at least one memory 170 and the computer program code are configured, with the at least one processor 160, to cause the device to perform at least the functionality described herein. The device comprises a force sensor element 180 that may comprise features or functions of one or more components. In one embodiment, the force sensor element 180 is an integrated chip comprising a memory and a processor. In one embodiment the force sensor element 180 comprises the functional chain of components and functions for sensing and calculating the force applied to the display 110, such as the CPU, the memory or display management circuit or function. The system described hereinafter may comprise a portion of the device, its components and/or peripherals connected to the device.

Figure 2A:
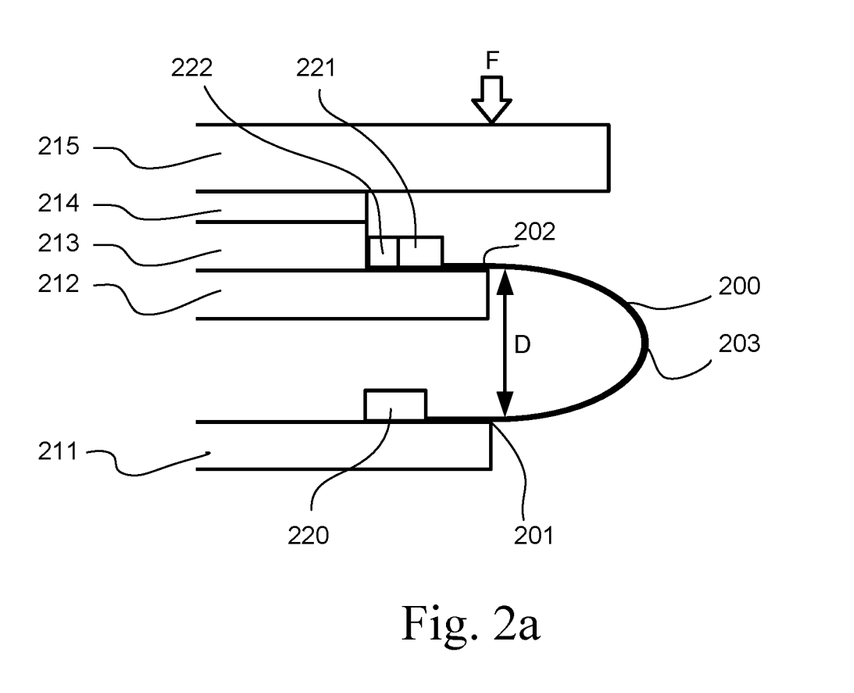
FIG. 2a schematically illustrates one embodiment of a sensor implemented on a device.

FIG. 2a illustrates schematically a sensor implemented on a device. A conductor 200 comprises a first end 201, the second end 202 and a bend 203 between them. The sensor is connectable to elements to be measured. The first end 201 is connectable to a first element 211 and the second end 202 is connectable to a second element 212. When applied to the embodiment shown in FIG. 1 the device comprises the body 100 as the first element and the display 110 as the second element. Continuing with FIG. 2a, the bend 203 on the conductor 200 is between the body 211 and the display 212. In one embodiment the display 212 comprises a bottom panel 212 and a top panel 213. An optically clear adhesive (OCA) or an optically clear resin (OCR) 214 connects a cover window 215 to the top panel 213 of the display.

In this context, directions such as "top", "higher" or "up" relate to the visible side of the display 212 having the cover window 215; and "bottom", "lower" or "down" relate to the side of the display 212 that is towards the internals of the device.

An electric voltage causes a self-capacitance in the conductor 200 relative to a diameter D of the bend 203. The diameter D of the bend 203 corresponds to a displacement of the display 212 in relation to the body 211. The diameter D is the distance between the two elements being connected to a curved conductor 200. The bend 203 may be elliptic of flattened semi-circle. The bend 203 angle may be less than 180 degrees, enabling the change in the self-capacitance to occur as a response to displacement between the first element 211 and the second element 212. In one embodiment the bend 203 is U-shaped. In one embodiment the bend 203 is V-shaped with the first end 201 being connectable to a first element 211 and the second end 202 being connectable to a second element 212. In one embodiment the displacement is relative to a force F applied on the display 212, wherein the change in the self-capacitance reveals the displacement of the display 212. The display 212 may be supported on a flexible frame or the display 212 may be made of flexible material that deforms slightly as a response to the applied force F. One example of the applied force F is a human finger gently pushing the display 212. One example of the applied force F is the human finger gently pushing the cover window laminated on the display.

In one embodiment the first end 201 and the second end 202 are connected to different layers of the display structure, while having the ability to detect the change in the diameter D. The first end 201 may be attached to a lower layer of the display panel and the second end 202 to an upper layer of the display panel, when the display is an OLED display. The first end 201 may be attached to a backlight unit and the second end 202 to the display panel, when the display is an LCD display.

A signal source 220 is configured to generate an electric sensor signal which is applied to the conductor 200, a signal receiver 221 is configured to receive the electric sensor signal from the conductor 200; and a signal analyzer 222 configured to detect a distortion caused by the self-capacitance from the received electric sensor signal. The signal source 220 is, in one embodiment, a switching mode signal generator. In one embodiment the switching mode signal generator comprises discrete analog components. In one embodiment the electric sensor signal comprises a waveform, which is in one embodiment a square waveform. In one embodiment the signal analyzer 222 comprises a charge amplifier made of analog components. The signal receiver 221 may be integrated into the charge amplifier. In one embodiment the sensor implementation is digital, a processor 160 and a memory 170 storing instructions that, when executed, control the operation of the sensor. In one embodiment the processor 160 and the memory 170 are implemented in a suitable position in the device. In one embodiment the processor 160 and the memory 170 are implemented in a stand-alone sensor. In one embodiment at least two of the signal source 220, the signal receiver 221 and the signal analyzer 222 are implemented on a same integrated circuit having the processor 160 and a memory 170. In one embodiment the connection between the conductor 200 and at least one of said integrated circuits is provided with indium tin oxide (ITO). In one embodiment the signal source 220, the signal receiver 221 and the signal analyzer 222 are implemented on a display controller of the device. In one embodiment the signal source 220, the signal receiver 221 and the signal analyzer 222 are implemented on a touch controller of the device.

In one embodiment the conductor 200 is configured on a flexible flat cable. In one embodiment the conductor 200 is configured on a flexible printed circuit. The conductor 200 may be a single trace conductor having a bend 203 that responds to a movement of either end of the conductor 200. In one embodiment the bend 203 has a spiral form twisting sideways. In one embodiment the bend 203 has a convex portion and a concave portion, for example an S-curve. The bend 203 is in one embodiment approximately 180 degrees. In one embodiment the conductor 200 is connected between the body 211 and a touch sensor layer on the display 212. In one embodiment the device comprises multiple conductors 200 in different positions, thereby enabling detection of a position of the force applied to the device. In one embodiment the conductor 200 is connected between two positions in a device or a structure, wherein the displacement between the positions may be detected due to the variable self-capacitance of the bending conductor 200. In one embodiment the conductor 200 is configured to detect structural deformations of a device or a structure.

The bend 203 causes self-capacitance to the conductor 200, further causing distortion in the sensor signal, wherein the distortion is measurable. In one embodiment the displacement of the second element 212 is relative to the force F applied on the second element 212 and the signal analyzer 222 is configured to transform the level of distortion to a force F detected from the second element 212.

Figure 2B:
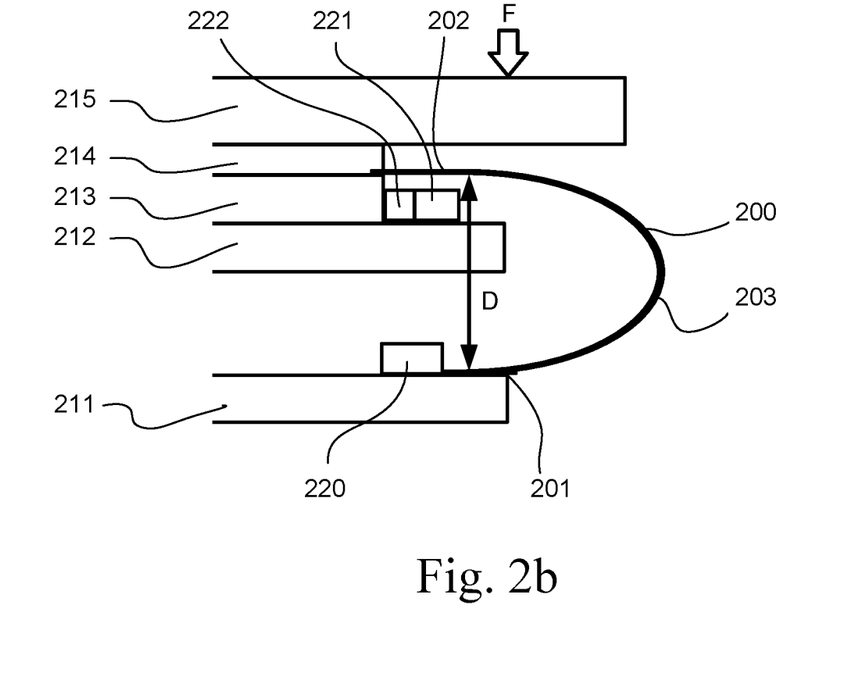
FIG. 2b schematically illustrates one embodiment of a sensor implemented on a device.

In FIG. 2a the displacement of the display is measured from the bottom panel 212 movement in relation to the body 211. FIG. 2b illustrates one embodiment where the second end 202 of the conductor 200 is configured between the top panel 213 and the optically clear adhesive (OCA) or the optically clear resin (OCR) 214.

Figure 3A:
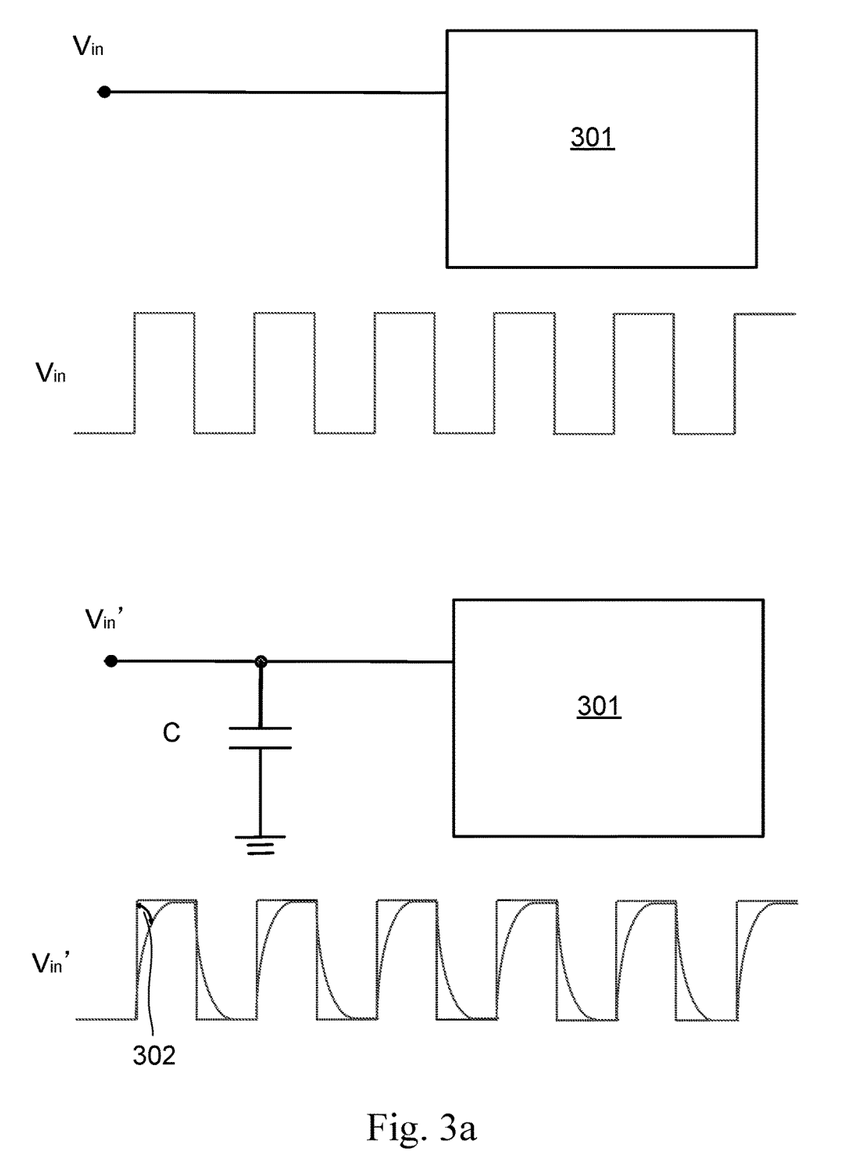
FIG. 3a schematically illustrates one embodiment of measuring self-capacitance.

FIG. 3a illustrates schematically one simplified model embodiment of the self-capacitance measurement with the signal receiver and the signal analyzer. The two examples show the conductor without the self-capacitance C and with the self-capacitance C. A waveform $V_{in}$ illustrates one embodiment of the electric signal applicable to the conductor without the self-capacitance, wherein the waveform $V_{in}$ is detected as square waveform. The self-capacitance C causes distortion to the waveform, wherein the original waveform $V_{in}$ at the conductor is detected as $V_{in}'$. The edges of the square waveform become rounded, resulting to change 302 in the waveform. The waveforms $V_{in}$ and $V_{in}'$ are superposed in the illustration to emphasize the distortion of the waveform. The detecting circuit 301 comprises at least the signal receiver and the signal analyzer and is configured to receive the signal $V_{in}'$ and in one embodiment measure the capacitance C from the conductor.

Figure 3B:
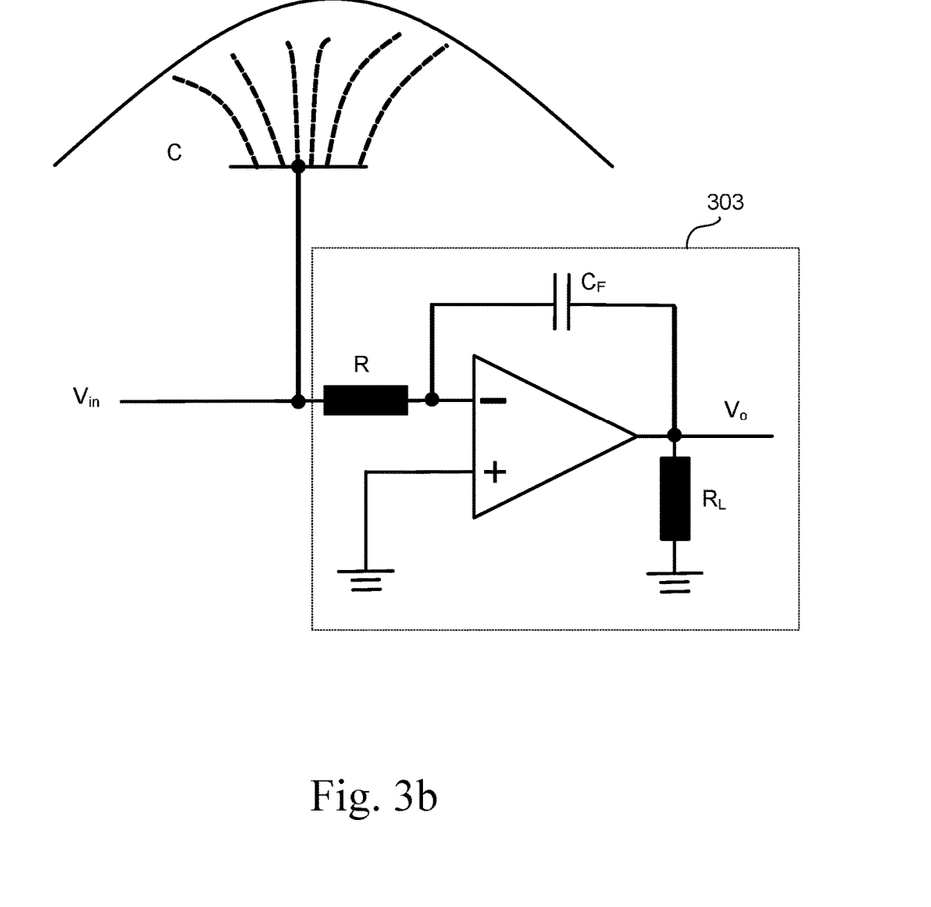
FIG. 3b schematically illustrates one embodiment of measuring self-capacitance.

FIG. 3b illustrates a simplified model of one embodiment for measuring the self-capacitance C with a charge amplifier circuit 303. The reference point of the self-capacitance may be considered to be a conceptual ground of the whole world, for example a ground in the infinity or a theoretical hollow conducting sphere, of infinite radius, centered on the conductor. $V_{in}$ illustrates the square waveform applied to the conductor, and $V_o$ illustrates the output of the waveform $V_{in}$ after the charge amplifier circuit 303. The charge amplifier 303 performs time integration of the current i according to:

$$v_0 = -\frac{1}{RC_F}\int_0^\tau v_{in}dt = -\frac{1}{C_F}\int_0^\tau i\,dt$$

wherein the current i is obtained from:

$$i = \frac{v_{in}}{R}$$

Figure 5A:
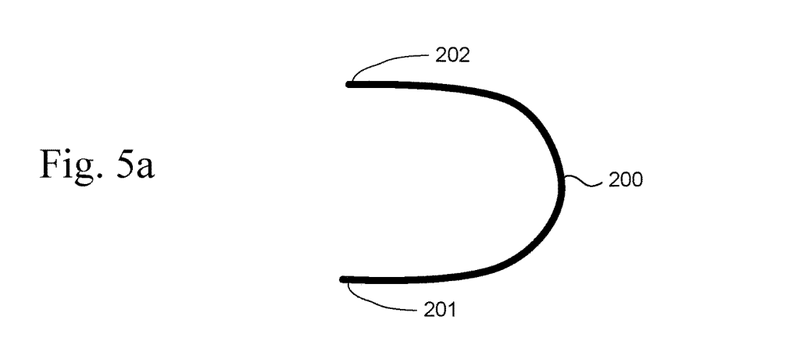
FIG. 5a schematically illustrates a side view of one embodiment.
Figure 5B:
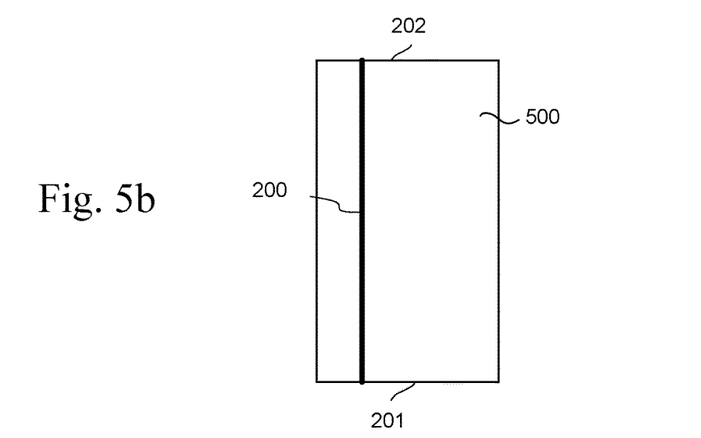
FIG. 5b schematically illustrates a view of one embodiment having an unbent conductor.
Figure 5C:
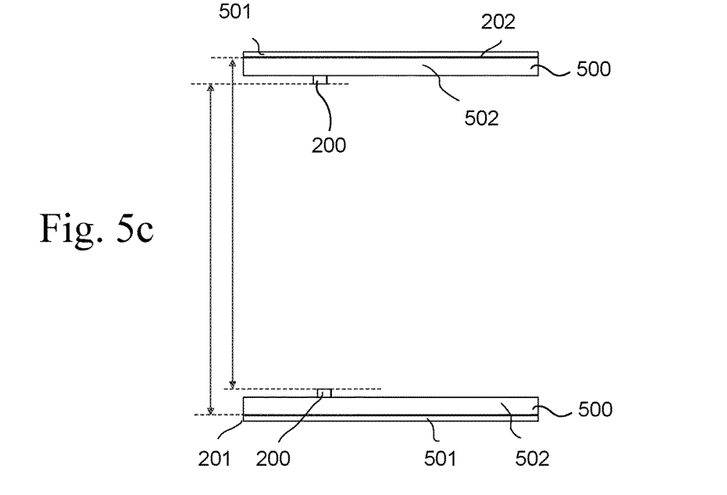
FIG. 5c schematically illustrates a sectional view of one embodiment having a bent conductor.

In the application where the ideal model of the self-capacitance does not apply, the electric field lines of the conductor enter into ground on the device. FIG. 5a illustrates schematically a side view of one embodiment of the bent conductor 200. FIG. 5b illustrates schematically an inner surface of the unbent conductor 200. The conductor 200 is configured on a flexible printed circuit (FPC) 500. In one embodiment the conductor 200 is configured on a flexible flat cable 500 (FFC). FIG. 5c illustrates a sectional view of the flexible printed circuit 500 in a bent position. An insulating layer 502 separates a ground shield 501 and the conductor 200. The ground shield 501 surrounds the conductor 200 in a bent position.

The electric voltage applied on the bent or deformed conductor 200 causes a self-capacitance. The self-capacitance is relative to the shape of the conductor 200, for example a reduced distance between the first end 201 and the second end 202 may cause a higher self-capacitance. The self-capacitance may be measured with different means. In one embodiment the signal source 220 provides the electric signal causing a charge in the signal receiver 221. A change in the received charge as a function of time is relative to the change in the self-capacitance and the change in the distance between the first element 211 and the second element 212. In one embodiment the signal analyzer 222 is configured to compare the capacitance formed by at least two sequences of the electric sensor signal to detect the change in the charge. The sequences may be equal in time domain having similar electric signals. In one embodiment a similar wave form is received, measured and analyzed to detect the change in the charge that is relative to the self-capacitance C of the conductor 200.

Figure 6:
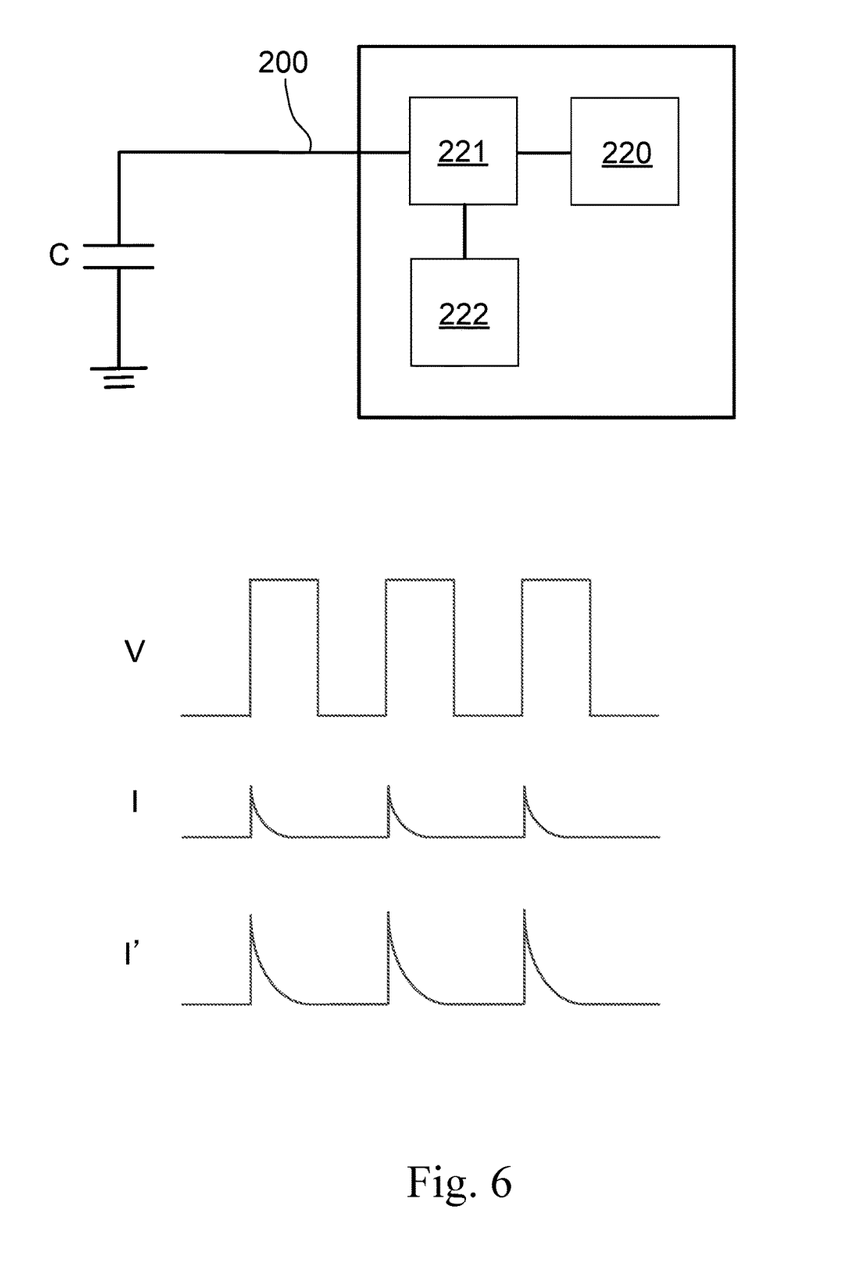
FIG. 6 schematically illustrates a simplified model of one embodiment of the self-capacitance sensor.

FIG. 6 illustrates schematically a simplified model of one embodiment of the self-capacitance sensor comprising the signal source 220, the signal receiver 221 and the signal analyzer 222. In one embodiment, the signal source 220 is configured to generate the electric voltage V and the signal receiver 221 is configured to measure electric current flowing in the conductor 200. The conductor 200 comprises the self-capacitance C that is relative to the shape of the conductor 200. The self-capacitance C may be regarded as a parasitic capacitance occurring in the conductor 200. When the signal source 220 applies a square waveform having a voltage V to the conductor, the signal receiver 221 observes the waveform I of current on the conductor 200. If the self-capacitance C increases, the signal receiver 221 observes waveform I' with larger peaks of the current. The signal analyzer 222 analyzes the waveform observed by signal receiver to determine the self-capacitance C.

Figure 4:
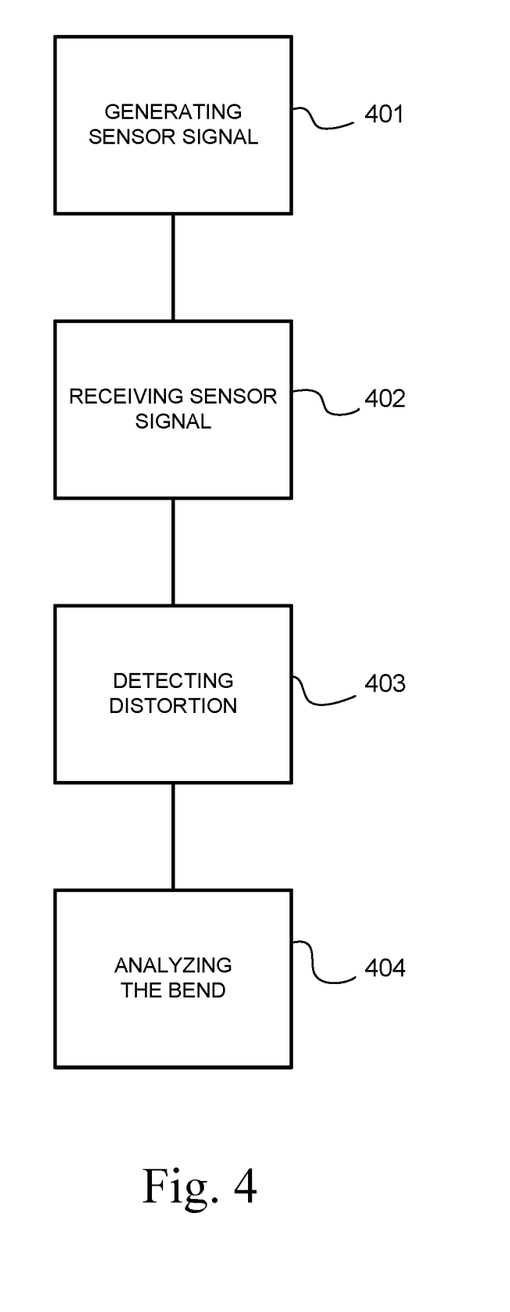
FIG. 4 schematically illustrates a method as a flowchart.

FIG. 4 illustrates steps of one embodiment of a method. In step 401 the method comprises generating an electric sensor signal and applying it to a conductor having a first end, the second end, and a bend between the first end and the second end, wherein the bend causes a distortion to the electric sensor signal and the diameter of the bend is relative to the distortion. Step 402 comprises receiving the electric sensor signal from the conductor. Step 403 comprises detecting the distortion from the electric sensor signal; and step 404 comprises analyzing the diameter of the bend.

In one embodiment of a method the method comprises generating an electric sensor signal, applying the signal to the conductor, receiving the signal, measuring a charge formed by the electric sensor signal from the conductor and detecting a change in the charge formed by the electric sensor signal in the received electric sensor signal. In one embodiment the method comprises analyzing the change to obtain the displacement between the first end of the conductor and the second end of the conductor. In one embodiment the relation between the change in the measured self-capacitance and the displacement between the first element and the second element is calibrated by measuring different suitable distances between the first element and the second element and storing the values of the corresponding self-capacitances to the memory. Later the measured values of self-capacitance occurring between the values occurred during the calibration phase may be interpolated to correspond a distance between the first element and the second element.

The sensor arrangement may be a very simple solution for detecting displacement between two elements. The conductor may be between two rigid circuit boards or the second end may be connected to a movable element. The conductor may use little space on the device and in many implementations it may be part of a flex cable or similar multi-conductor arrangement. In one embodiment the conductor is implemented to a structure or inside the structure, wherein the deformation of the structure may be monitored by detecting the self-capacitance of the bent conductor. In one embodiment the bent conductor is arranged between two flat structures, such as circuit boards or between the circuit board and the display panel.

One aspect discloses a sensor, comprising: a conductor having a first end and a second end, the conductor having a bend between the first end connectable to a first element and the second end connectable to a second element, an electric voltage causing a self-capacitance in the conductor relative to a diameter of the bend, wherein the diameter of the bend corresponds a displacement of the second element in relation to the first element, a signal source configured to generate an electric sensor signal, the sensor signal being applied to the conductor; a signal receiver configured to receive the electric sensor signal from the conductor; and a signal analyzer configured to detect a distortion caused by the self-capacitance from the received electric sensor signal. Alternatively or in addition, one aspect discloses a sensor, comprising: a conductor having a first end and the second end, the conductor having a bend between the first end connectable to a first element and the second end connectable to a second element, an electric voltage causing a self-capacitance in the conductor relative to a diameter of the bend, wherein the diameter of the bend corresponds a displacement of the second element in relation to the first element, a signal source at a first side of the bend configured to generate an electric sensor signal, the signal being applied to the conductor; a signal receiver at a second side of the bend configured to measure a charge formed by the electric sensor signal from the conductor; and a signal analyzer configured to detect a change in the charge formed by the electric sensor signal in the received electric sensor signal. In one embodiment the sensor comprises a processor and a memory storing instructions that, when executed, control the operation of the sensor. In one embodiment the signal source comprises a switching mode signal generator. In one embodiment the signal analyzer comprises a charge amplifier. In one embodiment the electric sensor signal comprises a waveform. In one embodiment the electric sensor signal comprises a square waveform. In one embodiment the conductor is configured on a flexible flat cable. In one embodiment the conductor is configured on a flexible printed circuit. In one embodiment the displacement of the second element is relative to the force applied on the second element and the signal analyzer is configured to transform the level of distortion to a force detected from the second element. In one embodiment the signal receiver comprises a charge amplifier. In one embodiment the signal analyzer is configured to compare the capacitance formed by at least two sequences of the electric sensor signal to detect the change in the charge. In one embodiment the displacement of the second element is relative to the force applied on the second element and the signal analyzer is configured to transform the change in the charge formed by the electric sensor signal to a force applied on second element.

Alternatively or in addition, one aspect discloses a sensor, comprising: a conductor having a first end and the second end, the conductor having a bend between the first end connectable to a first element and the second end connectable to a second element, an electric voltage causing a self-capacitance in the conductor relative to a diameter of the bend, wherein the diameter of the bend corresponds to a displacement of the second element in relation to the first element, means for generating an electric sensor signal and applying it to the conductor; means for receiving the electric sensor signal from the conductor; and means for detecting a distortion caused by the self-capacitance from the received electric sensor signal.

Alternatively or in addition, one aspect discloses a device comprising: a body, a display, a conductor having a first end connected to the body and the second end connected to the display, the conductor having a bend between the first end and the second end, an electric voltage causing a self-capacitance in the conductor relative to a diameter of the bend, wherein the diameter of the bend corresponds to a displacement of the display in relation to the body, a signal source configured to generate an electric sensor signal, the sensor signal being applied to the conductor; a signal receiver configured to receive the electric sensor signal from the conductor; and a signal analyzer configured to detect a distortion caused by the self-capacitance from the received electric sensor signal. In one embodiment the device comprises a processor and a memory storing instructions that, when executed, control the operation of the sensor. In one embodiment the signal source comprises a switching mode signal generator. In one embodiment the signal analyzer comprises a charge amplifier. In one embodiment the electric sensor signal comprising a square waveform. In one embodiment the conductor is configured on a flexible flat cable. In one embodiment the conductor is configured on a flexible printed circuit. In one embodiment the displacement of the display is relative to the force applied on the display and the signal analyzer is configured to transform the level of distortion to a force detected from the display.

Alternatively or in addition, one aspect discloses a device, comprising: a body, a display, a conductor having a first end connected to the body and the second end connected to the display, the conductor having a bend between the first end and the second end, an electric voltage causing a self-capacitance in the conductor relative to a diameter of the bend, wherein the diameter of the bend corresponds a displacement of the display in relation to the body, a signal source at a first side of the bend configured to generate an electric sensor signal, the sensor signal being applied to the conductor; a signal receiver at a second side of the bend configured to measure a charge formed by the electric sensor signal from the conductor; and a signal analyzer configured to detect a change in the charge formed by the electric sensor signal in the received electric sensor signal. In one embodiment the signal analyzer is configured to compare the capacitance formed by at least two sequences of the electric sensor signal to detect the change in the charge. In one embodiment the conductor is configured on a flexible flat cable or on a flexible printed circuit. In one embodiment the first end of the conductor is connected to a portion of the body having a lower portion of the display and the second end of the conductor is connected to a top portion of the display. In one embodiment the displacement of the display is relative to the force applied on the display and the signal analyzer is configured to transform the change in the charge formed by the electric sensor signal to a force applied on the display.

Alternatively or in addition, one aspect discloses a method, comprising: generating an electric sensor signal and applying it to a conductor having a first end, the second end, and a bend between the first end and the second end, wherein the bend is causing a distortion in the electric sensor signal and the distortion is relative to the diameter of the bend; receiving the electric sensor signal from the conductor; detecting the distortion from the electric sensor signal; and analyzing the diameter of the bend. In one embodiment the electric sensor signal comprises a square waveform. In one embodiment analyzing the diameter of the bend comprises detecting a force applied on an element connected to the second end of the conductor.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs). For example, some or all of the sensor functionality may be performed by one or more hardware logic components.

An embodiment, of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some embodiments, the user input device may detect voice input, user gestures or other user actions and may provide a natural user interface (NUI). This user input may be used to configure the device for a particular user. In an embodiment the display device may also act as the user input device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network).

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the above description, some component, device, module, unit, or element "being configured to" operate in a specific manner or to carry out specific operations, or carrying out such operations when in use, refers to that component, device, module, unit, or element comprising, or itself serving as, "means for" operating in that manner or carrying out those operations.

For example the signal source being configured to generate an electric sensor signal to the conductor comprises, or serves as, means for generating an electric sensor signal to the conductor. As another example, the signal receiver being configured to measure an electric sensor signal from the conductor comprises, or serves as, means for measuring an electric sensor signal from the conductor. As yet another example, the signal analyzer configured to detect a distortion caused by the self-capacitance from the received electric sensor signal comprises, or serves as, means for detecting a distortion caused by the self-capacitance from the received electric sensor signal.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A sensor, comprising:
   a conductor having a first end and a second end,
   the conductor having a bend between the first end connectable to a first element and the second end connectable to a second element,
   an electric voltage causing a self-capacitance in the conductor relative to a diameter of the bend, wherein the diameter of the bend corresponds a displacement of the second element in relation to the first element,
   a signal source configured to generate an electric sensor signal, the electric sensor signal being applied to the conductor;
   a signal receiver configured to measure a charge formed by the electric sensor signal from the conductor; and
   a signal analyzer configured to detect a change in the charge formed by the electric sensor signal.

2. A sensor according to claim 1, comprising a processor and a memory storing instructions that, when executed, control operation of the sensor.

3. A sensor according to claim 1, wherein the signal source comprises a switching mode signal generator.

4. A sensor according to claim 1, wherein the signal receiver comprises a charge amplifier.

5. A sensor according to claim 1, wherein the electric sensor signal comprises a waveform.

6. A sensor according to claim 1, wherein the signal analyzer is configured to compare a capacitance formed by at least two sequences of the electric sensor signal to detect the change in the charge.

7. A sensor according to claim 1, wherein the conductor is configured on a flexible flat cable.

8. A sensor according to claim 1, wherein the conductor is configured on a flexible printed circuit.

9. A sensor according to claim 1, wherein the displacement of the second element is relative to a force applied on the second element and the signal analyzer is configured to transform the change in the charge formed by the electric sensor signal to a force applied on the second element.

10. A device, comprising:
a body,
a display,
a conductor having a first end connected to the body and a second end connected to the display,
the conductor having a bend between the first end and the second end,
an electric voltage causing a self-capacitance in the conductor relative to a diameter of the bend, wherein the diameter of the bend corresponds a displacement of the display in relation to the body,
a signal source configured to generate an electric sensor signal, the electric sensor signal being applied to the conductor;
a signal receiver configured to measure a charge formed by the electric sensor signal from the conductor; and
a signal analyzer configured to detect a change in the charge formed by the electric sensor signal.

11. A device according to claim 10, comprising a processor and a memory storing instructions that, when executed, control operation of the device.

12. A device according to claim 10, wherein the signal source comprises a switching mode signal generator.

13. A device according to claim 10, wherein the signal analyzer comprises a charge amplifier.

14. A device according to claim 10, wherein the signal analyzer is configured to compare a capacitance formed by at least two sequences of the electric sensor signal to detect the change in the charge.

15. A device according to claim 10, wherein the conductor is configured on a flexible flat cable or on a flexible printed circuit.

16. A device according to claim 10, wherein the first end of the conductor is connected to a portion of the body having a lower portion of the display and the second end of the conductor is connected to a top portion of the display.

17. A device according to claim 10, wherein the displacement of the display is relative to a force applied on the display and the signal analyzer is configured to transform the change in the charge formed by the electric sensor signal to a force applied on the display.

18. A method, comprising:
generating an electric sensor signal and applying it to a conductor having a first end, a second end, and a bend between the first end and the second end, wherein the bend is causing a distortion in the electric sensor signal and the distortion is relative to a diameter of the bend;
receiving the electric sensor signal from the conductor;
detecting the distortion from the electric sensor signal; and
analyzing the diameter of the bend.

19. A method according to claim 18, wherein the electric sensor signal comprises a square waveform.

20. A method according to claim 18, wherein analyzing the diameter of the bend comprises detecting a force applied on an element connected to the second end of the conductor.

* * * * *